United States Patent
Nguyen et al.

(10) Patent No.: US 8,950,494 B2
(45) Date of Patent: Feb. 10, 2015

(54) FOAMERS FOR DOWNHOLE INJECTION

(75) Inventors: Duy T. Nguyen, Houston, TX (US);
Fenfen Huang, Sugarland, TX (US)

(73) Assignee: Nalco Company, Naperville, IL (US)

( * ) Notice: Subject to any disclaimer, the term of this patent is extended or adjusted under 35 U.S.C. 154(b) by 354 days.

(21) Appl. No.: 12/950,334

(22) Filed: Nov. 19, 2010

(65) Prior Publication Data
US 2012/0125620 A1 May 24, 2012

(51) Int. Cl.
*E21B 43/00* (2006.01)
*C09K 8/94* (2006.01)
*E21B 43/12* (2006.01)
*C09K 8/536* (2006.01)
*C09K 8/594* (2006.01)

(52) U.S. Cl.
CPC . *C09K 8/94* (2013.01); *E21B 43/12* (2013.01); *C09K 8/536* (2013.01); *C09K 8/594* (2013.01)
USPC ............ 166/309; 166/372; 507/135; 507/259

(58) Field of Classification Search
None
See application file for complete search history.

(56) References Cited

U.S. PATENT DOCUMENTS

| | | | |
|---|---|---|---|
| 2,731,414 A | | 1/1956 | Binder et al. |
| 3,269,468 A * | | 8/1966 | Phansalkar et al. ............. 175/71 |
| 3,330,346 A | | 7/1967 | Jacobs et al. |
| 3,610,340 A * | | 10/1971 | Hutchison et al. ............ 166/311 |
| 3,648,772 A * | | 3/1972 | Earlougher, Jr. ........... 166/270.1 |
| 3,720,498 A | | 3/1973 | Redmore |
| 3,804,754 A * | | 4/1974 | Ishii et al. ..................... 426/495 |
| 4,778,589 A | | 10/1988 | Reynolds |
| 5,000,262 A * | | 3/1991 | Danzik ....................... 166/272.3 |
| 5,005,644 A * | | 4/1991 | Wall et al. .................. 166/270.1 |
| 5,203,411 A * | | 4/1993 | Dawe et al. ................. 166/270.1 |
| 5,203,834 A * | | 4/1993 | Hutchins et al. ............... 166/270 |
| 5,229,017 A * | | 7/1993 | Nimerick et al. .......... 166/308.2 |
| 5,300,235 A | | 4/1994 | Clewlow et al. |
| 5,358,045 A * | | 10/1994 | Sevigny et al. ............ 166/270.1 |
| 5,512,212 A | | 4/1996 | Brown et al. |
| 5,565,416 A * | | 10/1996 | Wu ............................... 507/103 |
| 5,871,048 A | | 2/1999 | Tokar et al. |
| 6,143,709 A | | 11/2000 | Carey |
| 6,302,209 B1 * | | 10/2001 | Thompson et al. ........ 166/305.1 |
| 6,488,868 B1 | | 12/2002 | Meyer |
| 6,630,428 B1 | | 10/2003 | Furman et al. |
| 7,093,658 B2 | | 8/2006 | Chatterji et al. |
| 7,122,509 B2 | | 10/2006 | Sanner et al. |

(Continued)

FOREIGN PATENT DOCUMENTS

| EP | 0631605 | 4/1999 |
|---|---|---|
| WO | 02/092963 | 11/2002 |

(Continued)

*Primary Examiner* — Angela M DiTrani
*Assistant Examiner* — Anuradha Ahuja
(74) *Attorney, Agent, or Firm* — Senniger Powers LLP

(57) ABSTRACT

A method of foaming a fluid for recovering gas from a gas well and enhancing oil production from a gas-lifted oil well penetrating a subterranean oil-bearing formation is disclosed and claimed. The method includes introducing into the fluid a foam-forming amount of a composition comprising at least one compound selected from the following: $X^+$ alkyl benzene sulfonate; $X^+$ alkylnapthalene sulfonate; alkyldiphenyloxide disulfonate; diallyldiphenyloxide disulfonate; $X^+$ alkyl sulfate; naphthalene sulfonate formaldehyde condensate; and combinations thereof. The method of invention further provides foamers that are compatible with a reverse osmosis membrane.

16 Claims, 6 Drawing Sheets

RO Membrane Compatibility PRODUCT 1

Product 1 Flux Performance

(56) References Cited

U.S. PATENT DOCUMENTS

| | | |
|---|---|---|
| 7,204,311 B2 | 4/2007 | Welton et al. |
| 7,404,442 B2 | 7/2008 | Dahanayake et al. |
| 7,497,943 B2 | 3/2009 | Nguyen et al. |
| 7,971,659 B2 * | 7/2011 | Gatlin et al. ............ 175/69 |
| 7,992,653 B2 | 8/2011 | Zamora et al. |
| 2001/0009890 A1 | 7/2001 | Patel et al. |
| 2003/0078180 A1 * | 4/2003 | Munoz et al. ............ 510/407 |
| 2004/0110643 A1 | 6/2004 | Zevallos |
| 2004/0177968 A1 | 9/2004 | Ramachandran |
| 2005/0137114 A1 * | 6/2005 | Gatlin et al. ............ 510/424 |
| 2005/0250666 A1 * | 11/2005 | Gatlin et al. ............ 510/424 |
| 2006/0128990 A1 | 6/2006 | Davis et al. |
| 2007/0079963 A1 * | 4/2007 | Yang et al. ............ 166/270 |
| 2008/0200351 A1 * | 8/2008 | Dahanayake et al. ........ 507/202 |
| 2009/0131283 A1 | 5/2009 | Nguyen et al. |
| 2009/0308609 A1 * | 12/2009 | Curole et al. ............ 166/275 |

FOREIGN PATENT DOCUMENTS

| | | |
|---|---|---|
| WO | 2004/020553 | 3/2004 |
| WO | 2007/112254 | * 10/2007 |

* cited by examiner

FOAMERS FOR DOWNHOLE INJECTION

TECHNICAL FIELD

This invention relates generally to methods of using novel foamer compositions for treatment of oil and gas wells to enhance production. More specifically, the invention relates novel foamer compositions for treatment of oil, natural gas wells and coal seam gas (CSG), specifically where the produced water is treated by a reverse osmosis (RO) membrane.

BACKGROUND OF THE INVENTION

As natural gas wells mature, gas production decreases due to a decline in reservoir pressure. The formation fluids (i.e., water and liquid hydrocarbon condensate), which result from high production rates, can no longer be lifted from the well and accumulate in the well bore. This accumulation may cause the well to flow erratically at a much lower flow rate and eventually cease production. Foaming agents, also known as foamers, are one of the many methods available to de-water a gas well. Foamers can be applied either by batch treatment or continuous application. With the addition of foamer to the wellbore where the loading liquids are present, foam is generated with agitation from the gas flow. The surface tension and fluid density of the foam are much lower than the liquids so the lighter foam, where the bubble film holds the liquids, is more easily lifted by the low gas flow rate. In oil well production, foamers are also used in conjunction with a gas lift system to enhance oil recovery.

A lot of attention and effort have been attracted to recover coal seam gas (CSG) for use as natural gas fuel in recent times due to high energy demand. As a consequence of this type of production, there is a large volume of produced water, which is commonly cleaned and purified by using reverse osmosis (RO) membrane filtration units. This enables the diverse reuse of the water and offers a sustainable production approach, especially in countries such as Australia, where water is always in high demand. However, the membrane cleaning processes can only be applied for produced water which does not contain components blocking or fouling the membrane. The treated water can be reused for applications such as agriculture and municipal purposes. Typical foamers employed to accelerate the water unloading and maintain the integrity of the asset can generally destroy or block the RO membranes.

Currently available foamer technologies that are incompatible with the RO membranes include the following. WO 2009/064719 discloses imidazoline-based heterocyclic foamers for gas/oil well deliquification, but such quaternary compounds are not compatible with the RO membranes. U.S. 2006/0128990 teaches a method of treating a gas well applying a chloride free amphoteric surfactant. U.S. Pat. No. 7,122,509 provides a method of preparing a foamer composition having an anionic surfactant and a neutralizing amine. In U.S. 2005/0137114, an aqueous foaming composition comprising at least one anionic surfactant, cationic surfactant and at least one zwitterionic compound is disclosed. WO 02/092963 and U.S. 2007/0079963 disclose methods for recovering oil from a gas-lifted oil well using a lift gas and a foaming surfactant which consists of nonionic surfactants, anionic surfactants, betaines, and siloxanes.

While the discussed foamers contribute significantly to deliquifying solutions, there is still need for other cost-effective foamers which could provide superior foaming performance and are membrane compatible.

SUMMARY OF THE INVENTION

This invention accordingly provides novel foamers and applications for systems with RO membranes without compromising performance, while offering significant production benefits. The foaming composition according to the invention is a membrane compatible composition. That means that it does not contain any components destroying or blocking the membranes which are used for the cleaning of the produced water in the gas deliquification process.

In an aspect, the invention is a method of foaming a fluid, for recovering gas from a gas well and enhancing oil production from a gas-lifted oil well penetrating a subterranean oil-bearing formation. The method includes introducing into the fluid a foam-forming amount of a composition comprising at least one compound selected from the following: $X^+$ alkyl benzene sulfonate; $X^+$ alkylnapthalene sulfonate; alkyldiphenyloxide disulfonate; dialkyldiphenyloxide disulfonate; $X^+$ alkyl sulfate; naphthalene sulfonate formaldehyde condensate; and combinations thereof; wherein alkyl is $C_6$-$C_{22}$; and wherein each compound or combination is compatible with a reverse osmosis membrane. $X^+$ is an alkali metal cation, preferably sodium, or an organic counterion, such as triethanol amine, diethanol amine, monoethanol amine, and combinations thereof.

It is an advantage of the invention to provide a novel class of foamer as a RO compatible deliquification solution.

It is another advantage of the invention to provide novel foaming agents for downhole injection in oil and gas wells.

It is a further advantage of the invention to provide an efficient method of recovering oil from a gas-lifted oil well penetrating a subterranean oil-bearing formation.

Another advantage of the invention is to provide an efficient method to remove hydrocarbon fluids from a gas-producing well.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION OF THE INVENTION

Figure 1:
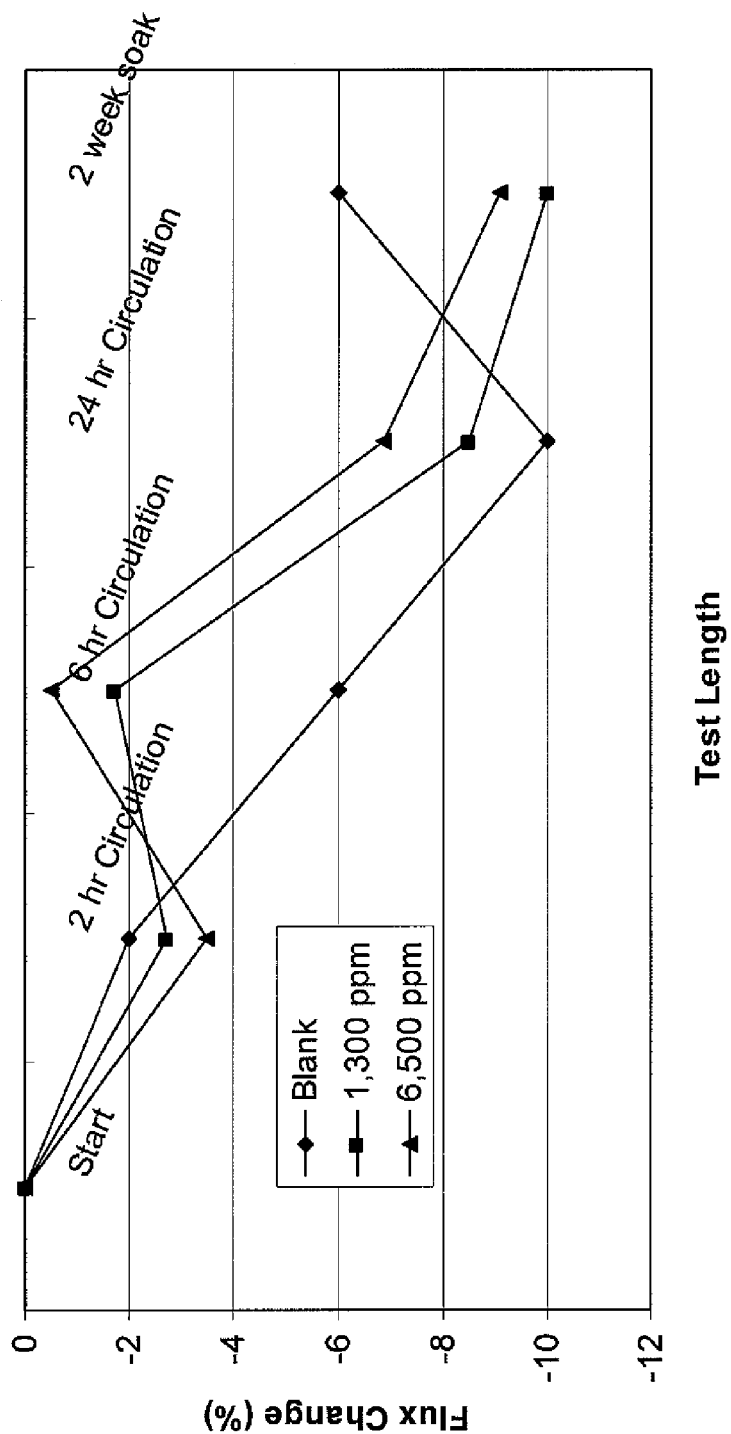
FIG. 1 illustrates the RO membrane compatibility testing results of Product 1 as explained in Example 1.
Figure 2:
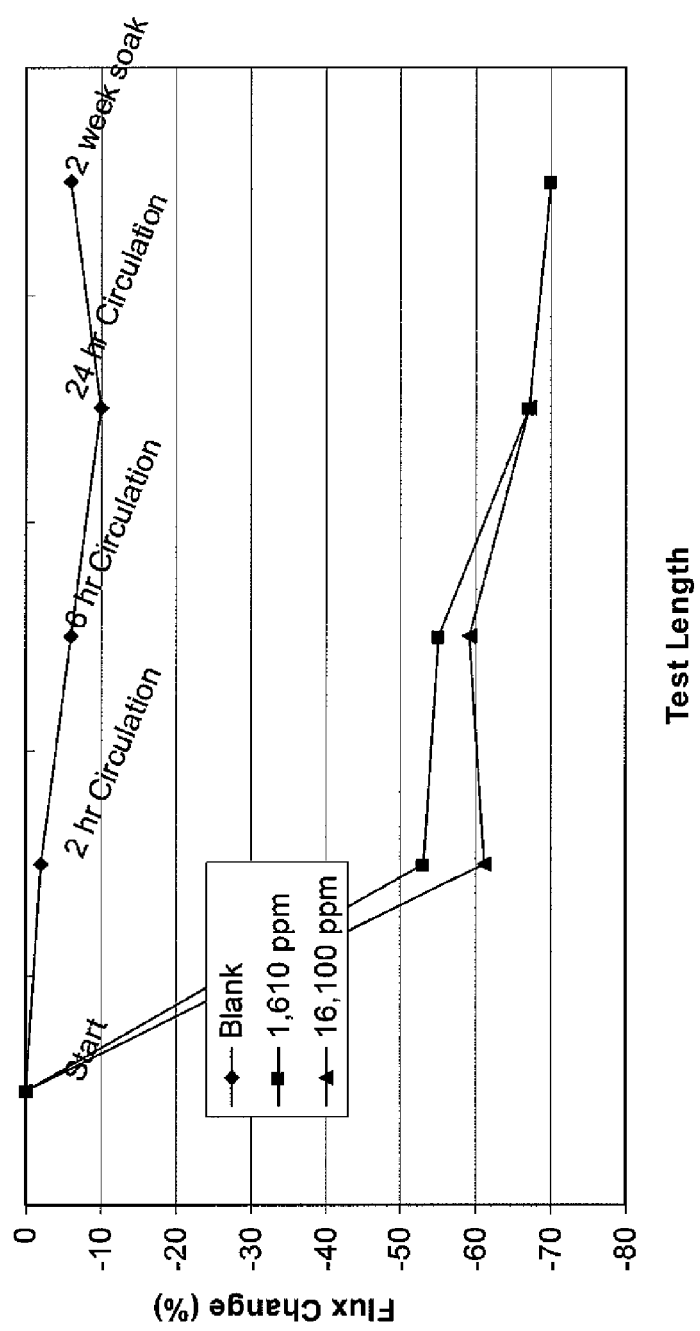
FIG. 2 illustrates the RO membrane compatibility testing results of best in class non-RO amphoteric foamer 1 as explained in Example 1.
Figure 3A:
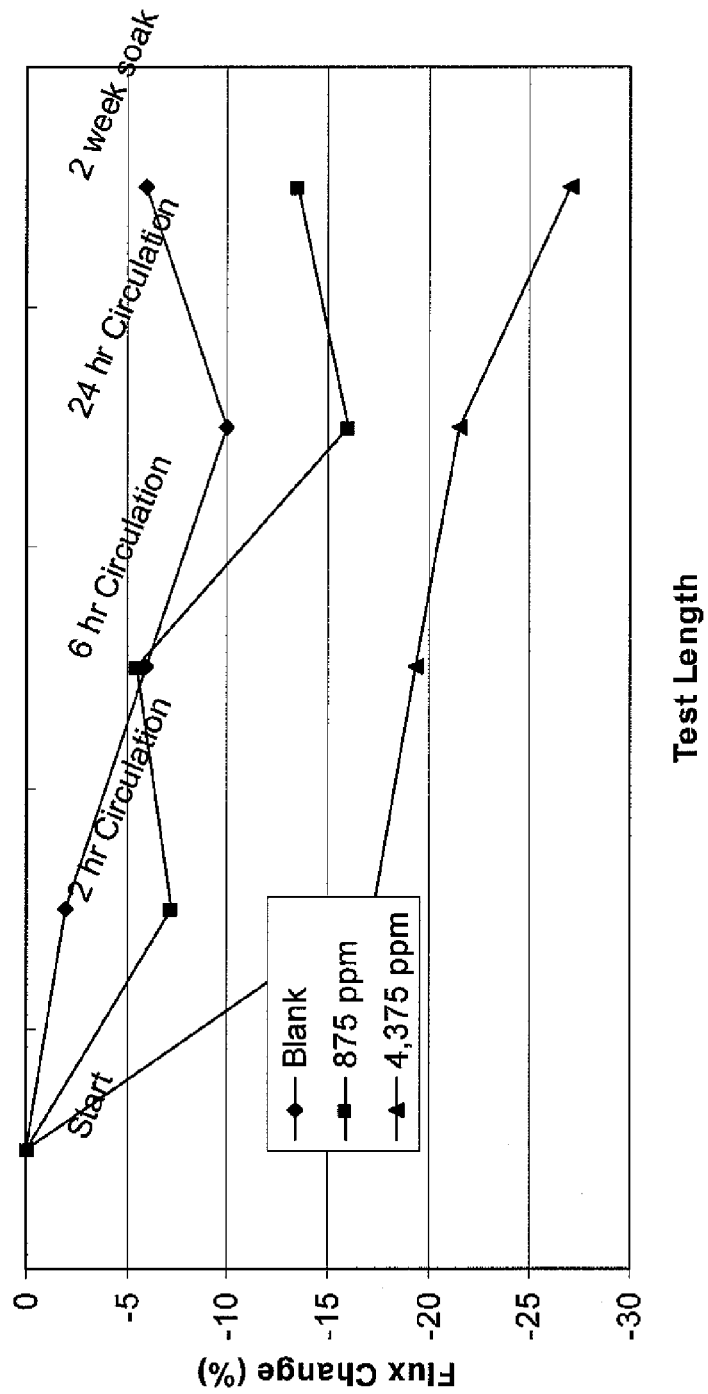
FIGS. 3a and 3b illustrate the RO membrane compatibility testing results of best in class non-RO anionic foamers 2 and 3 as explained in Example 1.
Figure 3B:
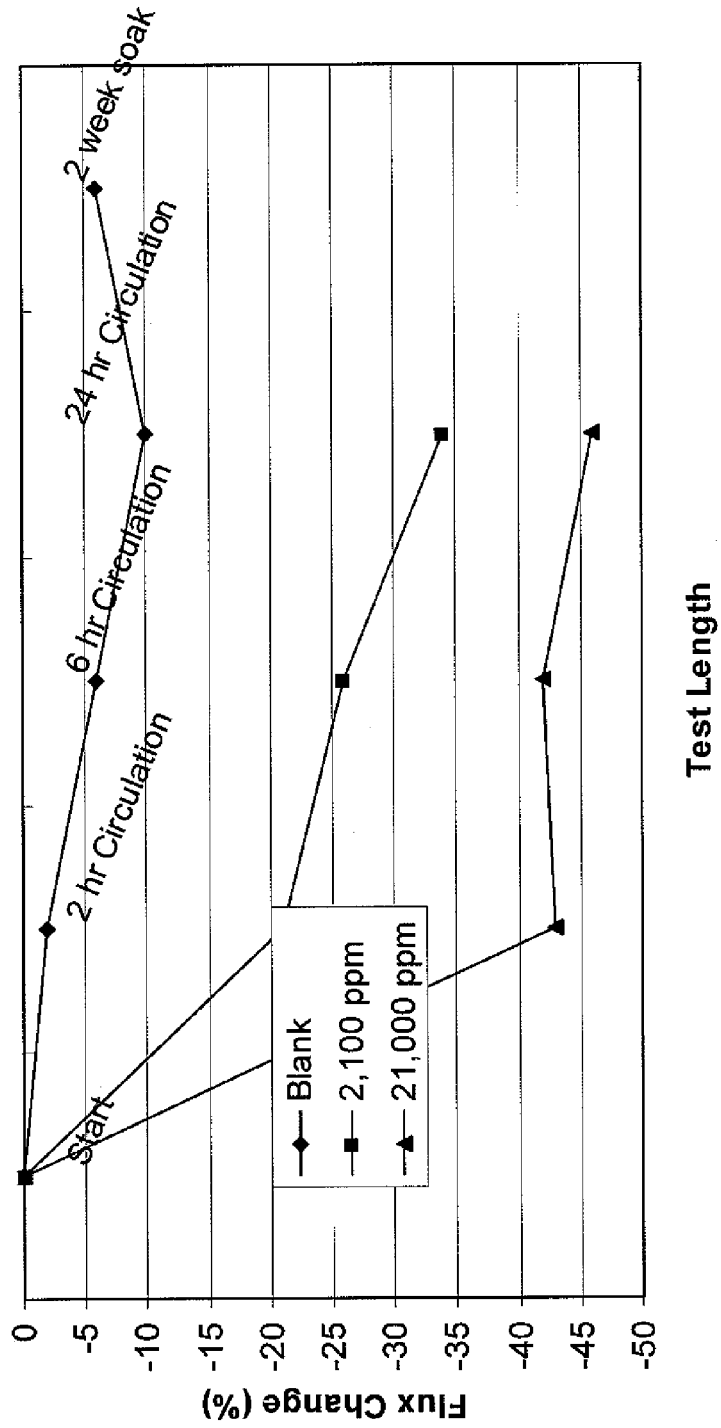

The method of using the foaming compositions of this invention have been shown to be effective for recovering natural gas from a gas well and recovering crude oil from a gas-lifted oil well penetrating a subterranean oil-bearing formation. That is, the foaming agents of the present invention effectively remove hydrocarbon and/or water or mixtures thereof from the wells. The effective amount of active ingredient in a formulation required to sufficiently foam varies with the system in which it is used. Methods for monitoring foaming rates in different systems are well known to those skilled in the art and may be used to decide the effective amount of active ingredient required in a particular situation. The described compounds may be used to impart the property of foaming to a composition for use in an oil or gas field application.

The described foaming compositions are particularly effective for unloading fluids (oil and/or water) from oil and gas wells under a variety of conditions. These compounds/compositions may be used in wells in which oil cuts in the field can range from about 0% (oil field) to 100% (refinery) oil, while the nature of the water can range from 0 to 300,000 ppm TDS (total dissolved solids). In addition, the bottom hole temperature can be between 60° F. and 400° F. The foamers of the invention can be applied by batch treatments or continuous applications via the casing/tubing annulus or via capillary strings and are typically introduced into the downhole end of a well. An exemplary method and apparatus of introducing foamers through the use of an injection nozzle capable of atomizing the foamer, as disclosed in U.S. Pat. No. 7,311,144. A batch treatment involves the application of a single volume of foamer to the well, as opposed to a smaller volume applied continuously for the case of a continuous application. The next batch is applied after a period of time when the foamer starts to lose its effectiveness or decline in performance.

In embodiments of this invention, classes of foamers for use in the method of the invention include sodium or other ions. Other ions may include, for example, alkali metal cations or organic counterions, such as triethanol amine, diethanol amine, monoethanol amine, and combinations thereof. Representative foamers include alkyl or alkenyl ($C_6$ to $C_{22}$) benzene sulfonate, sodium alkylnapthalene ($C_6$ to $C_{22}$) sulfonate, alkyldiphenyloxide disulfonate ($C_6$ to $C_{22}$), dialkyldiphenyloxide disulfonate ($C_6$ to $C_{18}$), sodium/other ions alkyl or alkenyl sulfate ($C_6$ to $C_{22}$), and naphthalene sulfonate formaldehyde condensate.

In an embodiment of the invention, sodium dodecylbenzene sulfonate is used as the foamer. The preparation of is well known in the art. The sodium dodecylbenzene sulfonate of this invention may be prepared, for example, by the following steps: First, sulfonation of the dodecylbenzene can be performed either by heating the dodecylbenzene with 20% oleum or contacting it with vaporized sulfur trioxide. Then, neutralization of the reaction mass with sodium hydroxide yields a product which is substantially sodium dodecylbenzenesulfonate in aqueous solution.

Foaming agents of the present invention can be formulated in a membrane compatible mixed solvent package that may contain water, xylene sulfonate, potassium formate and low or very low molecular alcohols such as methanol, and combinations thereof. The use of solvents reduces the viscosity, enhances the liquid unloading efficiency, lowers the freezing point of the foamer and improves compatibility with various components. The solvent is present in an amount ranging from about 5% to about 70%, about 95%, or about 99% by weight actives based on total weight of the composition. The foamer of the present invention is tolerant to high salt and hydrocarbon contents too and thus can be applied in wells with high salinity water or high hydrocarbon contents, in which case the foamer of this invention can remove hydrocarbon and/or water or mixtures from the natural gas and oil wells.

The described foamers or foaming agents of this invention may also be effective for penetrating subterranean oil-bearing or gas-bearing formations to recover natural gas from a gas well or recover crude oil from a gas-lifted oil well. Exemplary gas-lift methods for producing oil are disclosed in U.S. Pat. No. 5,871,048 and U.S. Patent Application No. 2004-0177968 A1. In other words, the foaming agents of the invention may be effective at aiding and making more efficient removal of hydrocarbon and/or water or mixtures thereof from wells. It should be appreciated that in some embodiments other corrosion inhibitors, scale inhibitors, and/or biocides may be used in conjunction with or in formulations including the foamers of this invention.

Corrosion inhibitors are usually formulated in conventional foamers to protect the downhole equipment from corrosive wellbore environment. The foamer of this present invention provides a certain level of corrosion protection, so offers a level of corrosion protection to the downhole equipment, without compromising RO operations. However, in certain cases other anionic and/or amphoteric corrosion inhibitors, may be used in conjunction with the foamer of the invention.

In embodiments, scale inhibitors may also be used in conjunction with the foamer of the present invention. Representative scale inhibitors include polyphosphates, polyphosphonates, other suitable scale inhibitors, and combinations thereof. The composition may also include a membrane compatible mixed solvent package that may contain water, xylene sulfonate, potassium formate and very low molecular alcohols such as methanol, and any combination thereof.

The composition of this invention can generate stable foams and is preferably present at a level of from about 10 ppm to about 100,000 ppm. A more preferred range is about 100 ppm to about 20,000 ppm. Most preferably, the range is from about 200 ppm to about 10,000 ppm. The foamer composition can optionally include additional actives that are RO membrane compatible; corrosion inhibitor, scale inhibitor, biocide, paraffin dispersant.

Even though this disclosure is directed primarily to oil and gas recovery applications, it is contemplated that the composition of the invention may also be used in other applications. For example, the composition may be used as a deposit control agent or cleaner to remove deposits (e.g., hydrocarbonaceous deposits) from wells and/or pipelines. "Hydrocarbonaceous deposit" refers generally to any deposit including at least one hydrocarbon constituent and forming on the inner surface of flowlines, pipelines, injection lines, wellbore surfaces, storage tanks, process equipment, vessels, the like, and other components in oil and gas applications. Such deposits also include "schmoo," which refers to a solid, paste-like, or sludge-like substance that adheres to almost any surface with which it comes in contact and is particularly difficult to remove. Deposits contributing to schmoo may include, for example, sand, clays, sulfur, naphthenic acid salts, corrosion byproducts, biomass, and other hydrocarbonaceous materials bound together with oil. In addition, the foamer of the instant invention may also be used as a paraffin-dispersant, emulsion breaker, corrosion inhibitor, and enhanced oil recovery agent, or in combination with paraffin-dispersants, emulsion breakers, corrosion inhibitors, and enhanced oil recovery agents.

The foregoing may be better understood by reference to the following examples, which are intended for illustrative purposes and are not intended to limit the scope of the invention.

EXAMPLE 1

RO Membrane Compatibility

The industry standard test protocol was utilized to determine the compatibility of the foamers with a Filmtec BW30 membrane. This test involved determining whether the foamers, by themselves, would negatively impact membrane performance. The following QC specification for Filmtec BW30 membrane is used: Feed Composition NaCl; Feed Concentration 2,000 ppm; Feed Temperature 25° C.; Feed Pressure 220 psi; Permeate Flow 45 LMH; Minimum Rejection 99.5%.

The RO membrane compatibility test protocol used in this example consisted of the following steps:
1. Cut sample coupon from membrane sheet
2. Determine baseline flux and salt rejection
   a) Recirculate test solution at pressurized standard conditions with the foamer. Test flux and salt rejection at 2, 6 and 24 hours.
   b) Soak in test solution for 2 weeks, rinse and test flux and sale rejection.

The standard test conditions were as follows. Flux and rejection were determined by using a test skid equipped with a flat-plate membrane cell for a membrane coupon with an effective membrane area of 0.023 m². The standard test solution contained 2,000 ppm NaCl for the BW30 membrane and was circulated through the membrane cell at a flow rate of 1,000 ml/min at the desired pressure.

The circulation test procedure was as follows. The test solution was made up to contain 2,000 ppm NaCl for the BW30 membrane and the foamer products at their respective concentrations (see Table 1 below). Rejection and flux at standard conditions were determined after 2, 6, and 24 hrs pressurized circulation using the test solution.

The soak test procedure was as follows. Membrane was soaked in a solution that contained the tested products at the desired concentration. Rejection and flux were determined with the standard test solution after 2 weeks soaking. The membrane was removed, rinsed, and then tested for flux and rejection using the standard test conditions for the membrane type.

Product 1 (sodium dodecylbenzenesulfonate) in its aqueous solution form was tested against two kinds of commonly used foamers: best-in-class non-RO betaine foamer 1 and non-RO anionic foamers 2 and 3 (Table 1). Foamer 1 contained coco-amidopropyl betaine as foaming agent, quaternary ammonium as corrosion inhibiting agent and phosphonate as anti-scaling agent. Best-in-class non-RO anionic foamer 2 was aqueous solution of laura α olefin sulphonate. Best-in-class non-RO anionic foamer 3 was ammonium alcohol ($C_6$-$C_{10}$) ether sulfate (AES) in water/isoproponal (IPA) solution, with weight percentage of AES:Water:IPA being 65:25:10.

TABLE 1

Foamers for RO Membrane Compatibility Test

| Foamer | Field treat rate (ppm) | Maximum test rate (ppm) |
|---|---|---|
| Product 1 | 1,300 | 6,500 |
| Best-in-class non-RO Betaine foamer 1 | 1,610 | 16,100 |
| Best-in-class non-RO anionic foamer 2 | 875 | 4,357 |
| Best-in-class non-RO anionic foamer 3 | 607 | 3,035 |

Before starting the test procedure, the base line salt rejection and flux was determined for each membrane sample. Before baseline data was recorded, the membrane was operated under standard test conditions for about 12 hours. The base line data point for each membrane sample became an "internal standard" against which the test data was compared, hence reducing the impact of membrane variability.

The circulation and soak test results of demineralized water (blank) are summarized in Table 2 and were used to compare against foamers at the various dosages. The blank test revealed equal or less than 10% flux change vs. baseline in 2, 6, and 24 hr circulation tests and 2 week soak test.

The circulation and soak test results of Product 1 at 1,300 ppm and 6,500 ppm dosages are summarized in Table 3. Equal or less than 10% flux change vs. baseline was observed in all the tests. Product 1 showed no impact in the testing compared to the blank and is thus classed as RO membrane compatible.

The circulation and soak test results of best-in-class betaine foamer 1 and anionic foamers 2 and 3 are summarized in Tables 4, 5, and 6, respectively. The betaine foamer 1, when dosed at 1,600 ppm field treat rate and 16,000 ppm, which is ten times the field treat rate, gave more than 50% flux change vs. baseline in all the tests. The test results of anionic foamers revealed more than 10% flux change in all the test conditions. Therefore, three of them are classed as RO membrane incompatible.

The RO membrane compatibility test results of Product 1, betaine foamer 1 and anionic foamers 2 and 3, together with the test result of blank water, were plotted in FIGS. 1, 2, 3a, and 3b respectively.

TABLE 2

RO Compatibility of Demineralized Water (blank)

| Blank | Rejection | Flux Change vs. Baseline |
|---|---|---|
| Baseline | 97.5% | N/A |
| 2 hr Circulation | 98.5% | −2% |
| 6 hr Circulation | 98.6% | −6% |
| 24 hr Circulation | 98.6% | −10% |
| 2 week soak | 98.7% | −6% |

TABLE 3

RO Compatibility of Product 1
Product 1

| | Rejection | Flux Change vs. Baseline |
|---|---|---|
| 1,300 ppm | | |
| Baseline | 98.3% | — |
| 2 hr Circulation | 99.0% | −2.7% |

TABLE 3-continued

RO Compatibility of Product 1
Product 1

| | Rejection | Flux Change vs. Baseline |
|---|---|---|
| 6 hr Circulation | 98.7% | −1.7% |
| 24 hr Circulation | 98.7% | −8.5% |
| 2 week soak | 98.7% | −10.0% |
| 6,500 ppm | | |
| Baseline | 98.3% | — |
| 2 hr Circulation | 99.0% | −3.5% |
| 6 hr Circulation | 99.0% | −0.5% |
| 24 hr Circulation | 99.0% | −6.9% |
| 2 week soak | 98.8% | −9.1% |

TABLE 4

RO Compatibility of Non-RO Betaine Foamer 1
Non-RO Betaine Foamer 1

| | Rejection | Flux Change vs. Baseline |
|---|---|---|
| 1,610 ppm | | |
| Baseline | 98.6% | — |
| 2 hr Circulation | 98.9% | −53.0% |
| 6 hr Circulation | 98.9% | −55.0% |
| 24 hr Circulation | 98.9% | −67.0% |
| 2 week soak | 98.7% | −70.0% |
| 16,100 ppm | | |
| Baseline | 98.0% | — |
| 2 hr Circulation | 98.5% | −61.0% |
| 6 hr Circulation | 98.5% | −59.0% |
| 24 hr Circulation | 98.6% | −67.0% |
| 2 week soak | — | — |

TABLE 5

RO Compatibility of Non-RO Anionic Foamer 2
Non-RO Anionic Foamer 2

| | Rejection | Flux Change vs. Baseline |
|---|---|---|
| 875 ppm | | |
| Baseline | 98.8% | — |
| 2 hr Circulation | 98.9% | −7.2% |
| 6 hr Circulation | 99.0% | −5.5% |
| 24 hr Circulation | 99.0% | −16.0% |
| 2 week soak | 98.9% | −13.5% |
| 4,375 ppm | | |
| Baseline | 98.9% | — |
| 2 hr Circulation | 99.1% | −17.3% |
| 6 hr Circulation | 99.1% | −19.3% |
| 24 hr Circulation | 99.2% | −21.5% |
| 2 week soak | 98.4% | −27.0% |

TABLE 6

RO Compatibility of Non-RO Anionic Foamer 3
Non-RO Anionic Foamer 3

| | Rejection | Flux Change vs. Baseline |
|---|---|---|
| 2,100 ppm | | |
| Baseline | 98.0% | — |
| 2 hr Circulation | 98.3% | −21.0% |
| 6 hr Circulation | 98.5% | −26.0% |

TABLE 6-continued

RO Compatibility of Non-RO Anionic Foamer 3
Non-RO Anionic Foamer 3

| | Rejection | Flux Change vs. Baseline |
|---|---|---|
| 24 hr Circulation | 98.8% | −34.0% |
| 2 week soak | — | — |
| 21,000 ppm | | |
| Baseline | 98.0% | — |
| 2 hr Circulation | 98.3% | −43.0% |
| 6 hr Circulation | 98.5% | −42.0% |
| 24 hr Circulation | 98.8% | −46.0% |
| 2 week soak | — | — |

For a person skilled in the art it was very surprising and unexpected that replacing alkyl linear sulfonates with aryl sulfonates would result in a decrease of flux change or an increase of the permeate stream. A skilled person would rather expect that the use of aryl sulfonate surfactants (e.g., alkyl benzene sulfonate) would result in a larger flux change or lower permeate streams due to the higher volume and bulkiness of the benzene groups.

EXAMPLE 2

Liquid Unloading Efficiency

The unloading efficiency testing of the foamers was performed using a dynamic foaming test apparatus in the laboratory. This provided a means to screen foamers under various conditions and rank performance. The dynamic foaming test used a liquid sample that consisted of synthetic brine or field brine with a percentage of field condensate or oil present. In some cases, additional species, such as coal fines or particulates, may be added to reproduce well production conditions. The sample was then dosed with the desired treat rate of foamer. 100 g of the total test fluid was slowly poured, into a 1,000 ml column at the bottom of which nitrogen gas (7 LPM) was sparged through a frit glass. The gas flow generated foam and unloading occurred.

Figure 4:
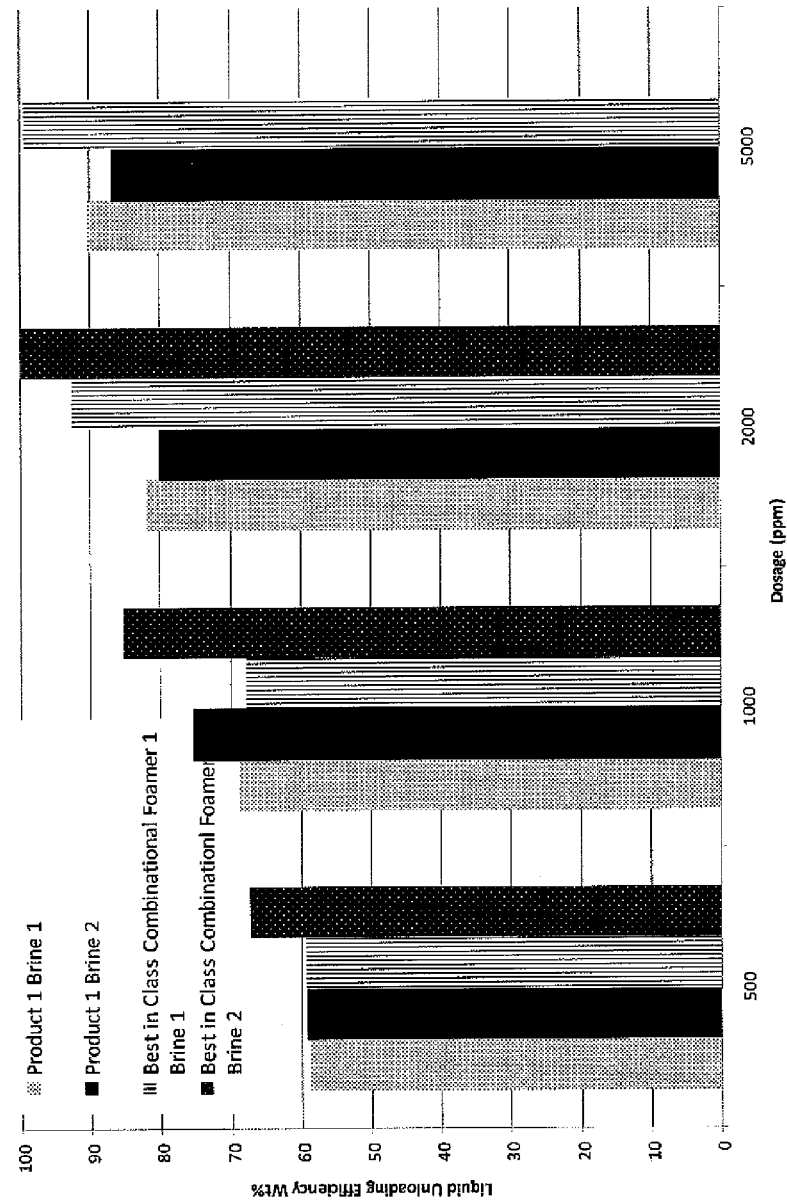
FIG. 4 illustrates dynamic unloading results of Product 1 vs. a best in class non-RO compatible foamer in the presence of 1% coal fines in two different brines as explained in Example 2.

The liquid unloading efficiency was calculated by dividing the weight of the liquid removed from the column after 15 min by 100 g. A best-in-class non-RO foamer was tested as a control. The test results of the control and Product 1 were plotted in FIG. 4. Product 1 shows excellent performance in liquid unloading and demonstrates the negligible impact solids, such as coal fines, have on the foam formation and stability. The performance of Product 1 was comparable to the best-in-class non-RO foamer under the tested conditions. The two brines used for testing are shown below.

| *Brine 1—Durham Ranch Water Chemistry (ppm) | |
|---|---|
| Sodium—Na | 2400 |
| Calcium—Ca | 8.1 |
| Potassium—K | 16 |
| Megnesium—Mg | 1.9 |
| Strontium—Sr | 3.9 |
| Barium—Ba | 3 |
| Iron—Fe | 0.1 |
| Chloride—Cl | 2500 |
| Sulfate—SO4 | <1 |
| Bicarbonate—HCO3 | |

| **Brine 2—Spring Gully Water Chemistry (ppm) | |
|---|---|
| Sodium—Na | 1900 |
| Calcium—Ca | 15 |
| Potassium—K | 15 |
| Megnesium—Mg | 3.6 |
| Strontium—Sr | 3.5 |
| Barium—Ba | 3 |
| Iron—Fe | 3 |
| Chloride—Cl | 1900 |
| Sulfate—SO4 | <1 |
| Bicarbonate—HCO3 | |

EXAMPLE 3

Corrosion Tendency Properties

A seven day material compatibility test was designed to evaluate the corrosion protection of chemicals of certain materials (e.g., metals). Coupons were statically immersed in the test liquid and kept at the desired temperature for a period of seven days. The corrosion rate was calculated based on the weight difference of the coupon before and after the test. The coupon was also inspected for pitting at 10× magnification after immersion. Table 6 summarizes the details of the coupons (material to be tested, manufacturer/supplier, compound used and coupon dimensions) used for this study. Besides C1018 carbon steel, SS2205, which is one of metals commonly used for capillary injection system, was evaluated as well.

TABLE 6

Metal Compatibility Study Parameters

| Material | Manufacturer/Supplier | Alloy | Dimensions |
|---|---|---|---|
| SS2205 | NES Capillary String | SS2205 | 2.2" × ¼" OD rods |
| C1018 | Corrosion Test Supplies | C1018 | 2" × ½" × 1/16" panels & 2" × ¾" × 1/16" panels |

Cleaning: The metal specimens (referred to as panels) were cleaned by the following method before the test. The panels were scrubbed with a commercial abrasive cleaner. Then the panels were rinsed in tap water and dried in acetone.

Measurements: The following were recorded initially on the coupons that underwent the specific tests. The coupons were weighed to the nearest tenth of a milligram on an analytical balance. The lengths and thicknesses or lengths and ODS of the panels were measured with a digital vernier caliper accurate to +0.001 inch.

Immersion: The following immersion procedure was utilized. The brine test solutions were saturated with carbon dioxide by bubbling in carbon dioxide for 15 minutes. The panels were immersed fully in two-ounce glass jars filled with 50 ml of the test solution. The jars were placed in an oven maintained at 130° F. for a period of 7 days. Each test was run in duplicate.

Time: The measured parameters were taken after immersion for 7 days at 130° F. After the test period, the following steps were taken to examine the coupon and corrosion rate. The panels were rinsed in deionized water, rinsed in acetone, and towel-dried. The weights and dimensions were measured after air-drying for 1 hour. Metal corrosion rates were calculated using the equation below. The coupons were inspected after immersion at 10× magnification for pitting.

Reporting of Results: The corrosion rates (measure in mils per year, mpy) were calculated using the following equation: Corrosion Rate=(Weight Loss of Coupon×534)/(Density in gm/cc×area in inches$^2$×time in hours). 534 is the corrosion constant. Table 7 lists the results for SS2205 panels. Table 8 lists results for C1018 panels.

The concentration of Product 1 was 5,000 ppm. Synthetic brine composition was NaCl=5.3 gms/liter and $CaCl_2$=0.44 gms/liter. There were two different panels, one ½" wide and one ¾" wide. For each pair of panels, the first was the ½" wide panel and the second was the ¾" wide panel. The wider panel had a larger area, lowering the corrosion rate.

TABLE 7

SS2205 7 Day Corrosion Test

| Chemical | Weight Change | Corrosion Rate | Appearance |
|---|---|---|---|
| PRODUCT 1 Neat | 0.0 mg | <0.001 mpy | No Visible Attack |
| PRODUCT 1 Neat | 0.0 mg | <0.001 mpy | No Visible Attack |

TABLE 8

C1018 7 Day Corrosion Test

| Chemical | Weight Change | Corrosion Rate | Appearance |
|---|---|---|---|
| PRODUCT 1 Neat | 6.0 mg | 1.05 mpy | Uniform Corrosion |
| PRODUCT 1 Neat | 10.1 mg | 1.23 mpy | Uniform Corrosion |
| Synthetic Brine | 26.1 mg | 4.73 mpy | Severely Pitted |
| Synthetic Brine | 46.6 mg | 5.68 mpy | Severely Pitted |
| Syn. Brine + PRODUCT 1 | 12.7 mg | 2.19 mpy | Uniform Corrosion |
| Syn. Brine + PRODUCT 1 | 17.7 mg | 2.16 mpy | Uniform Corrosion |

Observations: Table 7 summarized the SS2205 test results. After 7 days test in neat Product 1, both coupons had neither measurable weight loss nor pitting.

EXAMPLE 4

Linear Polarization Rate

The standard linear polarization resistance (LPR) bubble test is a corrosion test used to evaluate real-time response of corrosion rates with chemical addition. It can also be used to evaluate the partitioning properties of chemicals (i.e., how quickly and to what extent in the multiphase system the chemicals will enter the water phase under stagnant conditions) where corrosion reaction takes place. With respect to the field conditions, this test simulates low profile areas, such as dead legs and water traps, where no or very limited mixing exists and the performance of an inhibitor is determined by its capability to partition into the water phase.

The testing conditions are given in Table 9. Synthetic brine (0.535% NaCl, 0.0045% $CaCl_2.2H_2O$ by weight), was used, without addition of oil phase. The bubble cell tests were conducted at 130° F. (54° C.). The brine was saturated with $CO_2$ and stirred at 100 rpm before the foamer was dosed. Product 1 was evaluated at a dosage of 5,000 ppm based on total volume. Its protection of C1018 carbon steel was investigated. The cell was purged with $CO_2$ for 1 hour, and during this time the solution was also allowed to heat to the desired temperature of 130° F. (54° C.). After baseline corrosion data was taken for three hours prior to injection, the cells were injected with 5,000 ppm Product 1 based on total volume. The test was run for a total of 12 hours after injection.

TABLE 9

LPR Bubble Test of Product 1
Chemical Product 1
Dosage 5,000 ppm

|  | Corrosion Rate (MPY) | Protection (%) |
|---|---|---|
| Base line | 150.5 | — |
| 2 hrs after Dosing | 65.5 | 56.5 |
| 8 hrs after Dosing | 59 | 60.8 |
| 11.9 hrs after Dosing | 57 | 62.1 |
| 20 hrs after Dosing | 24 | 84.1 |

Figure 5:
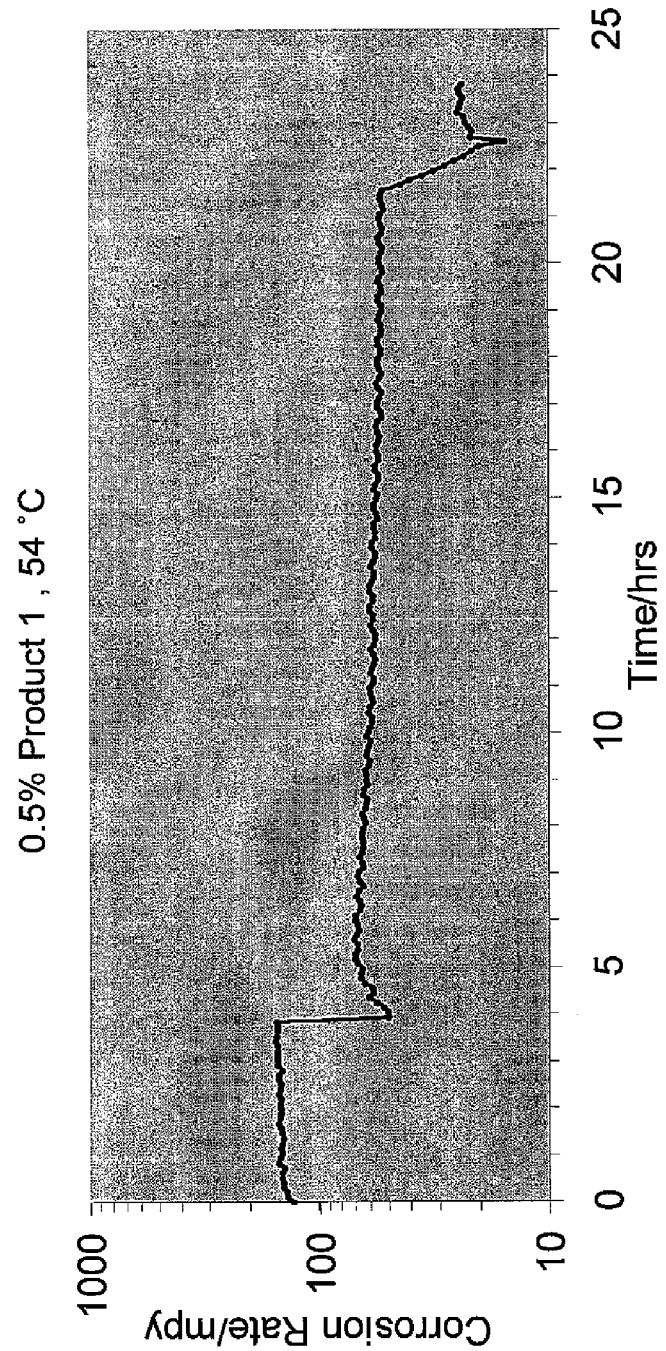
FIG. 5 illustrates the corrosion rate as a function of time during the standard linear polarization resistance (LPR) bubble test of Product 1 as explained in Example 4.

Upon the addition of 5,000 ppm Product 1, instant reduction of the corrosion rate was observed (FIG. 5). Corrosion rate of the inhibited solution over the 16 hour period after dosing of the chemical stayed much lower than the uninhibited baseline. The corrosion protection was calculated using the following equation: Protection=100×(Uninhibited corrosion rate−inhibited corrosion rate)/(uninhibited corrosion rate). Table 9 summarizes the corrosion protection rate in the bubble test and shows that the protection rate increased over the 20 hours testing period. The bubble test results demonstrated clearly that Product 1 affords corrosion protection to carbon steel.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method of enhancing oil production from a gas-lifted oil well penetrating a subterranean oil-bearing formation, the method comprising:
    creating a foamed fluid in the downhole end of the gas-lifted oil well by combining a fluid and a foam-forming amount of a composition comprising a foamer, wherein the foamer is X+ alkyl benzene sulfonate, X+ alkyl-napthalene sulfonate, alkyldiphenyloxide disulfonate, dialkyldiphenyloxide disulfonate, naphthalene sulfonate formaldehyde condensate, or a combination thereof; X+ is an alkali metal cation or an organic cation; and alkyl is $C_6$-$C_{22}$; the composition is present in the foamed fluid at a concentration of from about 10 ppm to about 100,000 ppm; and the composition is compatible with a reverse osmosis membrane;
    lifting and producing water or oil from the oil well with the foamed fluid; and
    cleaning the produced water with a reverse osmosis membrane;
    wherein, in a reverse osmosis compatibility test, the composition exhibits an equal or less than 10% flux change versus baseline when measured at 2 hours, 6 hours, 24 hours, and 2 weeks from start time of the compatibility test.

2. The method of claim 1, wherein $X^+$ is sodium or $X^+$ is selected from triethanol amine, diethanol amine, monoethanol amine, and combinations thereof.

3. The method of claim 1, wherein the foamer is sodium dodecylbenzene sulfonate.

4. The method of claim 1, wherein the composition further comprises a solvent.

5. The method of claim 4, wherein the solvent is selected from the group consisting of: water, xylene sulfonate, potassium formate, a low molecular weight alcohol, and combinations thereof.

6. The method of claim 4, wherein the solvent is methanol.

7. The method of claim 4, wherein the solvent is present in an amount ranging from about 5 to about 70% by weight based on a total weight of the composition.

8. The method of claim 4, wherein the solvent is present in an amount ranging from about 5 to about 95% by weight based on the total weight of the composition.

9. The method of claim 4, wherein the solvent is present in an amount ranging from about 5 to about 99% by weight based on the total weight of the composition.

10. The method of claim 1, wherein the composition further comprises an additive selected from the group consisting of: a corrosion inhibitor, a scale inhibitor, a biocide, and a paraffin dispersant; and
    wherein the additive is compatible with a reverse osmosis membrane.

11. The method of claim 1, wherein the composition is introduced as batch addition or continuously.

12. The method of claim 1, wherein the composition is present in the foamed fluid at a level of from about 100 ppm to about 20,000 ppm.

13. The method of claim 1, wherein the composition is present in the foamed fluid at a level of from about 200 ppm to about 10,000 ppm.

14. The method of claim 1, wherein the fluid comprises liquid hydrocarbon condensate and water.

15. A method of recovering gas from a gas well-penetrating a subterranean gas-bearing formation, the method comprising:
    creating a foamed fluid in the downhole end of the gas well by combining a fluid and a foam-forming amount of a composition comprising a foamer, wherein the foamer is X+ alkyl benzene sulfonate, X+ alkylnapthalene sulfonate, alkyldiphenyloxide disulfonate, dialkyldiphenyloxide disulfonate, naphthalene sulfonate formaldehyde condensate, or a combination thereof; X+ is an alkali metal cation or an organic cation; and alkyl is $C_6$-$C_{22}$; the composition is present in the foamed fluid at a concentration of from about 10 ppm to about 100,000 ppm; and the composition is compatible with a reverse osmosis membrane;

lifting and producing water or natural gas from the gas well with the foamed fluid; and cleaning the produced water with a reverse osmosis membrane;

wherein, in a reverse osmosis compatibility test, the composition exhibits an equal or less than 10% flux change versus baseline when measured at 2 hours, 6 hours, 24 hours, and 2 weeks from start time of the compatibility test.

16. The method of claim 15, wherein the produced water or natural gas further comprises coal seam gas.

* * * * *